United States Patent [19]

Klein et al.

[11] 4,111,155

[45] Sep. 5, 1978

[54] CATHODE COATING APPARATUS

[75] Inventors: Gerhart Paul Klein, Manchester, Mass.; John N. Oliver, Danville, N.H.; Arthur Emil Fitchman, Yonkers, N.Y.

[73] Assignee: P. R. Mallory & Co., Inc., Indianapolis, Ind.

[21] Appl. No.: 832,257

[22] Filed: Sep. 12, 1977

[51] Int. Cl.² .......................... B05C 9/04; B05C 9/14
[52] U.S. Cl. ............................. 118/642; 118/103; 118/106; 118/109; 118/119; 118/120; 118/126
[58] Field of Search ............... 118/106, 120, 109, 126, 118/68, 119, 415, 641, 314, 642, 411, 643, 103; 141/1.1

[56] References Cited

U.S. PATENT DOCUMENTS

| 3,951,688 | 4/1976 | Pankow et al. | 141/1.1 |
| 4,050,482 | 9/1977 | Ching et al. | 141/1.1 |

*Primary Examiner*—John P. McIntosh
*Attorney, Agent, or Firm*—Ronald S. Cornell; Israel Nissenbaum; Charles W. Hoffmann

[57] ABSTRACT

Apparatus for the construction of cathodes from pasty materials and expended metal substrates. A continuous roll of conductive metallic mesh is fed past a coating device and coated on one side. Simultaneously the coated metallic mesh is supported by an absorbent felt belt which is pressed against the mesh and removes excess liquids. After being coated on one side the mesh is turned over and further coated in a similar manner.

6 Claims, 4 Drawing Figures

CATHODE COATING APPARATUS

This invention relates to a machine for automatically producing cathodes for electrochemical cells. More particularly this invention relates to a machine for the formation of cathodes from pasty materials placed onto expanded metal substrates.

In the past, powdered materials, whether active or inactive, have been applied to metallic substrates (which substrates act as current collectors) by placing the materials, usually manually, in the form of a paste on either side of the substrate and pressing the material onto the substrate, between sheets of absorbent blotting paper. The pressing procedure usually takes place in dough rolling machines as used in the pastry making industry.

Because of the high liquid content of the paste which was spread onto the metal substrate mesh, drying by radiant means was not suitable. Drying according to this procedure, as a result of the high liquid content, would normally cause crazing of the dry paste. Accordingly, in the past blotting paper was used to absorb liquid from the paste spread onto the metal substrate. The blotting paper was used in a batch-type process and was applied to individual squares of coated substrate material. However, it was found that the continued use of blotting paper, even after such blotting paper was dried, was not feasible because of its tendency to wrinkle and distort, especially if such blotting paper was used in conjunction with a rolling pressure.

It is an object of the present invention to provide a machine, whereby cathodes may be automatically and effectively produced at low cost with the advantages of high-rate production, uniform coating thickness on a metallic mesh and elimination of blotting paper waste, and manual labor.

These and other objectives and advantages of the present invention will become more apparent from the following detailed discussion as well as from the drawings in which.

Generally, the present invention involves a machine used wherein a continuous roll of a conductive and usually metallic mesh is fed through the machine, whereby the mesh is first coated on one side with a pasty cathode material, whether active or inactive. Simultaneously, therewith, the metallic mesh with coated material is supported by a belt of an absorbent felt material unaffected by solvents used in making the coating paste. The absorbent felt material serves the dual purpose of supporting the mesh and coating paste while they are being pressed and absorbs excess liquids from the pasty coating layer. The absorbent felt material belt also has the advantage that during the process it is constantly recycled and continuously relieved of its liquid.

After being coated on one side by the cathode paste, the coated metal mesh is turned to its reverse side. The expanded metal mesh is further coated on its reverse side in a manner similar to that above. Further procedures include the continuous calendering of the coated expanded metal between two endless absorbent felt belts, which absorb excess mositure from each side of the coated metal substrate until a uniformly coated expanded metal sheet is obtained. The sheet is thereafter dried without crazing and cut to desired sizes.

Figure 1:
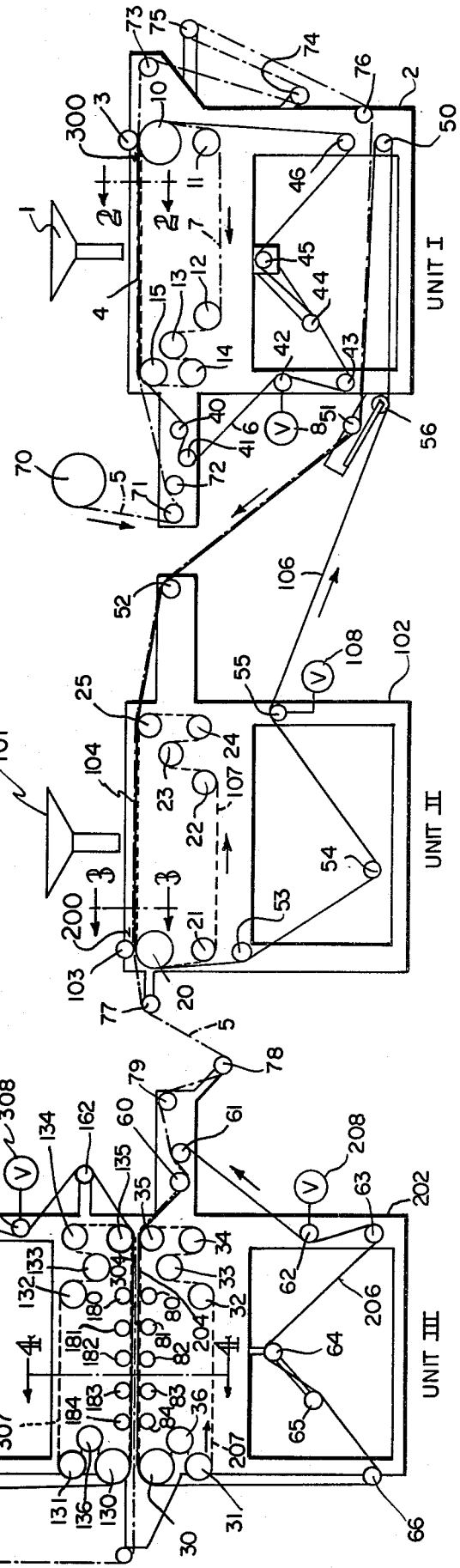
FIG. 1 is a schematic view of a cathode machine and particularly of the belting system of three units of the machine of the present invention.

In FIG. 1, the cathode machine of the present invention is depicted as Units I, II, III, IV, and V. Units I and II are substantially alike and comprise a portion of the machine in which the cathode material is applied to the expanded metal. Unit III is a calendering section wherein the coated expanded metal is compressed and calendered as desired. All three of the above mentioned units have belting systems, on suitable frameworks 2, 102, and 202 respectively, comprising rubberized drive belts and absorbent felt belts for absorption of expressed liquids. The endless rubber drive belt 7 in Unit I passes over rollers 10 through 15 with roller 13 being driven by a motor (not shown) which drives the belt. Similarly, in Unit II the endless rubberized drive belt 107 passes over rollers 20 through 25 with roller 23 being driven by a motor to power such drive belt.

Unit III has two such drive belts 207 and 307 arranged in opposed fashion. The first of such belts passes over rollers 30 through 36 and the latter drive belt passes over rollers 130 through 136. Motors drive rollers 36 and 136 in order to further drive each of the respective belts. Drive rollers 13, 23, 36, and 136 are arranged out of line with the other respective rollers in each of the individual belt drive systems in order to provide greater surface contact with each individual belt for greater efficiency in driving the respective belts.

The absorbent felt belts, a preferred embodiment of which is polypropylene felt, are endless belts. Felt belt 6 in Unit I passes over rollers 40 through 46, 10 and 15. In Unit II, the belt 106 is partially connected to the base of framework 2 of Unit I and such belt passes over rollers 50 through 56, 25 and 20. In Unit III, two absorbent felt belts revolve around rollers in respective upper and lower portions of said Unit. The lower endless felt belt 206 is carried around rollers 60 through 66, 30 and 35 the upper absorbent belt is carried around rollers 160 through 166, and 130 and 135.

In Unit I, the felt belt 6 and the rubberized drive belt 7 meet, with the felt belt resting on the rubberized belt to form a table 4 between rollers 15 and 10. Similarly, the felt belt 106 and the rubberized belt 107 in Unit II meet with the felt belt resting on the rubberized belt to form a table 104 between rollers 20 and 25. In Unit III, rubberized belt 207 and the absorbent felt belt 206 meet with the felt belt resting on the rubberized belt to form table 204 between rollers 30 and 35. Directly opposing such table is another table formed with felt belt 306 below rubberized belt 307 to form table 304.

Figure 2:
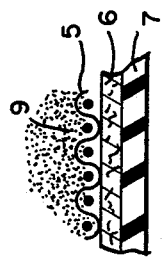
FIG. 2 is a cross section taken along lines 2—2 of FIG. 1 of the coated expanded metal and belt supports.

A roll of expanded metal sheet is fed through the above belt systems, around rollers 71 and 72 in the direction indicated by the arrow, after which it is fed onto table 4. Simultaneously therewith a combination hopper-shredder-dispenser 1 into which a pasty mass of cathode material has been placed dispenses such cathode material onto said expanded metal in the form of elongated masses. In effect the cathode material is shredded by a disc with sharp edged perforations and pushed against such disc by a reciprocating piston and is continuously cut thereby into small portions, which may, for example, be sausage shaped and which drop onto the expanded metal 5. These masses are transversely spread across the surface of the expanded metal 5 relative to the movement of the expanded metal to form a relatively uniform coating on said expanded metal by a wiper blade 300 between the hopper 1 and rollers 3 and 10. The wiper blade is an out of plane "W" shaped piece of wire horizontally placed with the wings parallel to the edges of the mesh doing the wiping and the center being raised and attached to a transversely reciprocating (relative to the mesh movement) shuttle powered by compressed air with alternating valves for such reciprocating movement. The wiping speed should be sufficiently rapid such that there is no excessive build up of cathode material before coating roller 3. A cross-section of such applied materials 9 onto said expanded metal 5 resting on felt belt 6 and rubberized belt 7 is shown in FIG. 2. As the belts proceed, the expanded metal with coated material 9 passes between rollers 3 and 10. Coating or doctor roller 3 can be adjusted by raising and lowering its height. Accordingly, when the coated expanded metal passes between such rollers, material 9 can be compressed onto the expanded metal to the desired height. Height sensors immediately after such rollers, not shown, constantly check such height.

Coating roller 3 is powered by a separate motor and rotates in the same direction as that of the belts 6 and 7 and at a speed several times faster. A doctor blade may substitute for roller 3, however the roller is more preferred because of greater versatility in compressing, coating and adjustments. The doctor roller 3 (or blade) must be held in tight positioning for effective operation.

Figure 3:
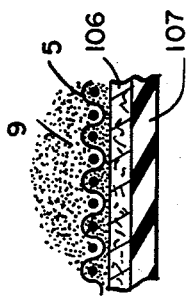
FIG. 3 is a cross section taken along line 3—3 of FIG. 1.

When the expanded metal with the cathode material thereupon is squeezed between rollers 3 and 10, the absorbent felt belt 6 absorbs expressed liquid and retains it until it reaches fixed perforated roller 42 at which point, as shown, a vacuum 8 is applied through the perforated roller 42 to the felt belt 6 where such liquid is substantially removed with the amount of liquid removed being dependent upon the vacuum strength. The felt belt is capable of absorption under pressure and is continuously recycled with absorption and evacuation of liquid. The coated expanded metal 5 after passing through rollers 3 and 10 travels around rollers 73 through 76 whereupon it is fed, in a direction 180° opposite that of its original path, onto a second absorbent felt belt 106, which travels in the direction shown by the arrows. The reverse side of the expanded metal now faces upward with its coated side directly adjacent felt belt 106. The felt belt 106 carries the expanded metal 5 around roller 51 which is self-adjusting to allow passage of such coated expanded metal 5 therethrough, past roller 52 and thereafter onto table 104. Table 104 is directly beneath a second hopper-shredder-dispenser 101 wherein a second layer of pasty cathode material is deposited and wiped on the reverse side of said expanded metal 5, as above, with a cross section of such coating material 9 and expanded metal 5 being shown in FIG. 3. The expanded metal 5 after being coated on its reverse side is then fed through rollers 103 and 20.

Roller 103 functions in a manner similar to that of roller 3 in Unit I and is height adjustable. When expanded metal 5, coated on both sides, passes between rollers 103 and 20, the expressed liquid is absorbed by felt belt 106, which then carries it to the point at which belt 106 passes fixed perforated roller 55. Perforated roller 55 has attached thereto a vacuum apparatus 108 which draws off a substantial amount of the liquid absorbed by the felt belt. The dually coated expanded metal 5 travels into Unit III past rollers 77–79 and 61, 60 at which point it passes through the calendering portion of Unit III. The dually coated expanded metal 5 passes between rollers 35 and 135 which are positioned on either side of said expanded metal and then linearly through a series of opposed rollers 180 through 184, and 80 through 84, respectively having constantly diminished distance between them whereby the coated expanded metal has such coating compressed thereupon. As the coated expanded metal 5 passes through such calendering unit between tables 204 and 304, the absorbent felt belts 206 and 306 absorb expressed liquid. Belt 206 is relieved of its liquids at fixed perforated roller 62 with a vacuum apparatus 208. Absorbent felt belt 306 is relieved of its liquid when it passes fixed perforated roller 163 by vacuum apparatus 308. Though not necessary, the liquids gathered by the various vacuum outlets may be collected for reuse in preparing the cathode pastes.

Figure 4:
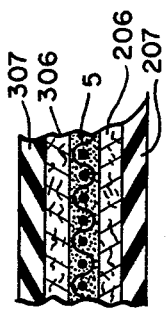
FIG. 4 is a cross section taken along line 4—4 of FIG. 1.

The compressed and calendered cathode material in expanded metal 5 is shown in FIG. 4. FIG. 4 shows the composite of the drive belts 307 and 207, the absorbent belts 306 and 206, and the cathode material as compressed into the extanded metal 5.

After the cathode material has been compressed and calendered onto and into expanded metal 5, it is drawn into conventional infra red drying machines shown as Unit IV, and finally onto a motorized take-up reel, Unit V. The completed reel is then used whereby the cathode material is cut to desired sizes and shapes.

An example of a cathode paste material useful in the present invention is one comprising a mixture of carbon, Teflon binder, and a solvent of an equivolume mixture comprising water and alcohol.

Suitable materials for the absorbent belt include the above mentioned polypropylene felt, polyethylene felt, and other materials which have the characteristics of high absorbency and resistance to degradation, both mechanically and chemically. Furthermore, such belts should not be substantially liquid swellable but should have sufficient pore openings for absorption of liquid without detrimental swelling whereby uniformity in cathode construction could be affected, especially with respect to cathode thickness parameters. The absorbent belt should also be sufficiently thick and porous such that it can absorb even under pressure.

A criteria of the cathode paste material used is that it should be sufficiently moist in order for it to be applied and spread uniformly onto an expanded metal substrate. It has generally been found that a liquid content of at least 50 percent by weight for the above mentioned carbon paste mix is sufficient in order to make satisfactory cathodes in accordance with the present invention. A preferred liquid content is that of between 70 and 90 percent by weight.

Active cathode materials which can be used, using the method and machine of the present invention include manganese dioxide, silver chromate, vanadium pentoxide, molybdenum trioxide, carbon monofluoride, and other oxides, halides and the like which can be used in a paste form in accordance with the above criteria.

Suitable materials for the expanded material substrate include aluminum, stainless steel, tantalum, titanium, molybdenum, and other conductive mesh materials used as electrode current collectors.

The mesh must be sufficiently open such that the applied cathode material on one side is able to weld with applied cathode material to the other side for structural integrity.

In order that the present invention be more completely understood, the following example is given as illustrative of the formation of a cathode using the above described machine. This example is set forth primarily for the purpose of illustration and any specific enumeration is not to be interpreted as a limitation. Except where indicated, all parts are parts by weight.

EXAMPLE

A carbonaceous cathode is made using the above described machine wherein carbon black is mixed with an equivolume mixture of alcohol and water with 0.1 percent (of the carbon weight) Teflon dispersion whereby the resulting paste has a liquid content of about 80% and such material is placed onto hopper-shredder-dispensers 1 and 101. The above material is dispensed and spread onto an aluminum expanded metal sheet with a thickness of about 16 mils. The thickness of the cathode material plus the expanded metal after the first coating or compressing stage is about 22 mils. After a second coating is similarly applied to the opposite side of the expanded metal, the thickness of the dually coated expanded metal cathode is about 30 mils. The dually coated element is then calendered and dried. After drying, the cathode as above described has a thickness of about 32 mils and the cathode is bone dry. The finished cathode can then be cut to any desired size and used in an electrochemical cell.

It is understood that the changes in variations in various cathode and cell constructions can be made without departing from the scope of the present invention as described in the following claims:

What is claimed:

1. A machine for the continuous fabrication of electrochemical cell cathodes comprised of coated expanded material comprising means for dispensing a pasty coating material onto one side of a moving expanded substrate material, means for uniformly spreading said coating material onto said substrate, means for compressing said coating material onto said substrate, means for simultaneously therewith absorbing liquids expressed from said pasty material, wherein said absorbent means comprises a moving endless absorbent belt in contact with said substrate, and means for removing absorbed liquid from said belt, means for obverting said substrate onto a second moving endless absorbent belt, means for dispensing additional of said coating material onto the reverse side of said substrate, means for uniformly spreading said additional coating material, means for compressing said coating material onto said reverse side of said substrate, means for simultaneously therewith absorbing liquids expressed from said pasty material wherein said absorbent means comprises said second moving endless absorbent belt in contact with said coated substrate, and means for removing a substantial amount of said absorbed liquid from said second belt, means for calendering said dually coated substrate, means for absorbing liquids expressed from said dually coated substrate simultaneously therewith wherein said means comprises third and fourth moving endless absorbent belts in contact with said coated expanded material, individual means for removing absorbed liquid from said third and fourth belts, means for drying said calendered dually coated expanded material, and means for taking up the resulting dried dually coated expanded material.

2. The machine of claim 1 wherein said means for uniformly spreading said coating material onto said substrate and said means for uniformly spreading said additional coating material comprise reciprocating elements moving in a horizontal direction transverse said substrate movement.

3. The machine of claim 1 wherein said means for compressing said coating material onto said substrate and said means for compressing said coating material onto the reverse side of said substrate comprise doctor rolls rotating at a speed greater than that of the moving expanded substrate material.

4. The machines of claim 1 wherein said first, second, third and fourth moving endless absorbent belts are comprised of polypropylene felt.

5. The machine of claim 1 wherein said means for obverting said substrate comprises rollers, upon which said substrate travels being positioned such that said substrate is carried in a direction 180° opposite to that of the original path of said substrate;

6. The machine of claim 1 wherein said means for removing absorbed liquid from said first, second, third, and fourth absorbent belts comprise individual vacuum means applied to perforated rollers over which each of said belts pass respectively.

* * * * *